United States Patent
Erskine et al.

[11] Patent Number: 6,129,490
[45] Date of Patent: Oct. 10, 2000

[54] REMOVABLE TIE-DOWN DEVICE

[76] Inventors: James H. Erskine, P.O. Box 415, Omak, Wash. 98841; James D. Erskine, P.O. Box 387, Haleiwa, Hi. 96712

[21] Appl. No.: 09/531,032

[22] Filed: Mar. 20, 2000

[51] Int. Cl.[7] .................................................. B60P 7/08
[52] U.S. Cl. .......................... 410/110; 410/106; 410/116
[58] Field of Search .................................... 410/101, 106, 410/110, 116; 114/218; 24/115 K, 265 CD; 248/499

[56] References Cited

U.S. PATENT DOCUMENTS

| | | | |
|---|---|---|---|
| 2,609,761 | 9/1952 | Clark . | |
| 3,334,914 | 8/1967 | Vierregger . | |
| 3,357,670 | 12/1967 | Larson | 410/106 |
| 3,960,091 | 6/1976 | Ehlert . | |
| 4,191,108 | 3/1980 | Jones | 410/110 |
| 4,760,986 | 8/1988 | Harrison . | |
| 4,850,770 | 7/1989 | Millar | 410/110 |
| 5,416,956 | 5/1995 | Rubin | 410/116 X |
| 5,443,341 | 8/1995 | Hamilton | 410/116 |
| 5,676,508 | 10/1997 | Weicht | 410/101 |
| 5,738,471 | 4/1998 | Zentner et al. | 410/110 |
| 5,915,900 | 6/1999 | Boltz | 410/110 |

*Primary Examiner*—Stephen T. Gordon

[57] ABSTRACT

A tie-down device for use with trucks or the like which requires an item or items to be secured to the truck bed by means of a rope, cable, strap, etc. The device is removable and securable without the need for drilling holes and without marring or scratching finished surfaces to which it is attached. Its primary use is, but is not limited to, the downwardly-protruding interior edge of a truck bed cap. This is accomplished by a single-piece design which is cylindrical in shape with a slot that runs the length of the piece forming a hook-like configuration and creating a front and rear portion to the device. At the front portion there is a radius groove at each end of the device with eased edges. This forms a cleat-like configuration to the front portion of the device and accommodates various means of securing items to a truck bed or the like. With the front portion configured as a cleat, and the rear portion as a hook, this allows the device to not only be easily secured to the truck bed cap, but also allows the various means of fastening items to the device at any angle or direction.

3 Claims, 4 Drawing Sheets

REMOVABLE TIE-DOWN DEVICE

CROSS-REFERENCE TO RELATED APPLICATIONS

Not applicable.

FEDERALLY-SPONSORED RESEARCH FOR DEVELOPMENT

None/Not applicable.

REFERENCE TO A MICROFICHE APPENDIX

Not applicable.

BACKGROUND

1. Field of Invention

This invention relates to a one-piece tie-down device, which quickly and easily attaches to a truck bed or other similar object to secure a load.

2. Description of Prior Art

For years truck owners and operators have struggled with the problem of having an adequate means of securing a load to or within a truck bed. Typically there is only one stake pocket on each side of the bed, front and back, and/or a factory-installed strap or hoop at each corner of the bed. If an across-the-bed toolbox is installed in the bed of a pickup, that leaves only the rear stake pockets or factory-installed hoops/straps to attach to. In either case, the operator has a very limited means to adequately attach ropes, straps, etc., to secure the load. Quite often these factory points of attachment are not at an optimum location.

There are a variety of devices on the market which endeavor to remedy this problem. The majority of these devices in one way or another require the drilling of holes in a truck bed, cap or rail. Doing so requires a certain amount of time and effort. The device is, therefore, not easily relocated to accommodate the securing of varying loads of different sizes and/or locations within the truck bed. The drilling of holes in the truck bed, rail or cap is something irreversible and can cause that portion of metal around the hole to be susceptible to rust. This type of device requiring the drilling of holes has not been a very desirable solution for many truck owners.

Those devices that do not require the drilling of holes have some disadvantages, as well, i.e., some are confined to the location of the stake pockets; some protrude above the top of the truck bed cap, which for some owners is also not aesthetically acceptable; and some interfere with bed covers or canopies. Others are limited in the ability to secure a load from different directions or angles to the device without affecting the device's performance. The majority of these devices that do not require drilling to secure the devices to the truck bed consist of a closed-end loop or hole. This requires that the means of securing the load, such as a rope, cable or strap, will have to be completely threaded through the hole or loop. This is not always the most convenient method. Also, some devices will not accept certain ropes or straps with hooks attached to the end of the device.

One disadvantage of Pat No. 2,609,761 to Clark (1952) is that it has no provision for protecting the finished surface it would be attached to from being married or scratched. The set screw, as well as the ball end of the loop to which ropes, etc., would fasten to, will mar and scratch the finished surfaces.

Our invention solves this problem in that the set screw is the only part of the device that comes in contact with any visible, finished surface. The set screw has a nylon tip that presents it from marring or scratching a finished surface.

Another disadvantage is that this device requires that ropes, cables, straps, etc., be threaded through the device. This is not always very convenient.

Our invention solves this problem by not requiring such fastening means to be threaded through the device. This is possible because of its design, which is similar to a cleat, and in which such means of securing or fastening items can quickly, easily and simply be hooked or wrapped around the ends of the device.

The disadvantage of Pat. No. 3,334,914 to Vierregger (1967) is that it requires the drilling of a hole through the truck bed to secure it in place. It is held in place by means of a threaded stud and nut. This does not allow the device to be quickly and easily secured to the truck bed, nor does it allow it to be quickly and easily removed or relocated. To attach or secure this device to the truck bed requires a considerable amount of time and effort. If it is removed, it leaves behind unsightly holes that will be very susceptible to rust and corrosion.

Our invention solves this problem by means of attaching to the downwardly-protruding edge of the interior portion of the truck bed cap (rail). It is attached by means of a nylon-tipped set screw. This allows the device to be quickly and easily secured, as well as removed and/or relocated.

The disadvantage of Pat. No. 3,960,091 to Ehlert (1976) is that it requires the drilling of holes through the truck bed to secure it in place. It is held in place by means of three screws or bolts. This does not allow the device to be quickly and easily secured to the truck bed, nor does it allow it to be quickly and easily removed or relocated. To attach or secure this device to the truck bed requires a considerable amount of time and effort. If it is removed, it leaves behind unsightly holes that will be very susceptible to rust and corrosion.

Our invention solves this problem by means of attaching to the downwardly-protruding edge of the interior portion of the truck bed cap (rail). It is attached by means of a nylon-tipped set screw. This allows the device to be quickly and easily secured, as well as removed and/or relocated.

One disadvantage of Pat. No. 4,760,986 to Harrison (1988) is that it has no provision for protecting the finished surface to which it would be attached from being marred or scratched. The set screw, as well as the ball end of the loop to which ropes, etc., would fasten to, will mar and scratch the finished surfaces.

Our invention solves this problem in that the set screw is the only part of the device that comes in contact with any visible finished surfaces. The set screw has a nylon tip that prevents it from marring or scratching finished surfaces.

Another disadvantage is that this device requires ropes, cables, straps, etc., to be threaded through the device. This is not always very convenient.

Our invention solves this problem by not requiring such fastening means to be threaded through the device. This is possible because of its design, which is similar to a cleat, in which such means of securing or fastening items can quickly, easily and simply be hooked or wrapped around the ends of the device.

Yet another disadvantage is that this device consists of multiple pieces. The device actually has to be disassembled each time it is attached or removed from the truck bed rail. Therefore, the device is not quickly and easily attached or removed.

Our invention solves this problem by means of its simple, one-piece design. It is quickly and easily attached or removed by means of tightening or loosening the nylon-tipped set screw.

One disadvantage of Pat. No. 4,850,770 to Miller (1989) is that this device consists of multiple pieces. The device actually has to be disassembled each time it is attached or removed from the truck bed rail. Therefore, the device is not quickly and easily attached ore removed.

Our invention solves this problem by means of its simple, one-piece design. It is quickly and easily attached or removed by means of tightening or loosening the nylon-tipped set screw.

Although this device has a provision to protect the finished surfaces, it will in time, if left in the same location, begin to mar a considerable portion of the truck bed cap. This portion of the truck bed is highly visible and such marring of the finish would not be desirable.

Our invention solves this problem by means of the nylon-tipped set screw and the point of attachment to the truck bed cap at the interior portion of the truck bed cap rail. The contact portion of our device to the visibly finished areas of the truck finish is the tip of the nylon set screw. This contact is very minimal and because it is a very positive connection when properly installed, vibration and other forces applied to it will not cause it to move and mar the truck finish.

Another problem with this device is that it protrudes above the top plane of the truck bed cap. This prevents the installation of truck bed covers, such as canopies and tonneau covers, while the device is attached to the truck bed. It is also not aesthetically appealing.

Our invention solves this problem by its simple, clean, one-piece design. By attaching the device to the interior rail portion of the truck bed cap, it does not protrude above the top plane of the truck bed cap thereby allowing the installation of canopies, tonneau covers, etc., while the device is still attached to the truck bed rail. This allows the device to continue to function as a tie-down device in securing items within the truck bed, and within the confines of a canopy or the like.

The disadvantage of Pat. No. 5,443,341 to Hamilton (1995) is that it is not positively secured in position. If pressure or force is applied to it at off angles to the device, it can loosen and slide out of position. This would cause items secured to the truck bed to become loose or unsecured. The likelihood of this is increased when there is no pressure or force applied to the device. The device relies on a plastic, tapered wedge to secure it to the truck rail. This wedge can become dislodged with no pressure applied, due to normal vibration of the truck and bed area, when the truck is in motion.

Our invention solves this problem by means of a set screw which makes a positive connection to the truck bed rail. When properly installed, the device's performance is not hampered by pressure or force pulling on it at off angles to the device, nor will the device loosen due to vibrations when the device is not in use (no pressure or force applied to it). When the device is properly installed, it will remain in place until one desires to remove it.

Another problem with this device is that it protrudes above the top plane of the truck bed cap. This prevents the installation of truck bed covers, such as canopies and tonneau covers, while the device is attached to the truck bed. Also, it is not aesthetically appealing.

Our invention solves this problem by not requiring such fastening means to be threaded through the device. This is possible because of its design, which is similar to a cleat, in which such means of securing or fastening items can quickly, easily and simply be hooked or wrapped around the ends of the device.

The disadvantage of Pat. No. 5,676,508 to Weibht (1997) is that this device requires the drilling of a hole through the truck bed to secure it in place. It is held in place by means of a threaded stud and nut. This does not allow the device to be quickly and easily secured to the truck bed, nor does it allow it to be quickly and easily removed or relocated. To attach or secure this device to the truck bed requires a considerable amount of time and effort. If it is removed, it leaves behind unsightly holes that will be very susceptible to rust and corrosion.

Our invention solves this problem by means of attaching to the downwardly-protruding edge of the interior portion of the truck bed cap (rail). It is attached by means of a nylon-tipped set screw. This allows the device to quickly and easily be secured, as well as removed and/or relocated.

Also, another problem with this device is that it protrudes above the top plane of the truck bed cap. This prevents the installation of truck bed covers, such as canopies and tonneau covers, while the device is attached to the truck bed. It is also not aesthetically appealing.

Our invention solves this problem by its simple, clean, one-piece design. By attachment to the interior rail portion of the truck bed cap, it does not protrude above the top plane of the truck bed cap thereby allowing the installation of canopies, tonneau covers, etc., while the device is still attached to the truck bed rail. This allows the device to still function as a tie-down device in securing items within the truck bed and within the confines of a canopy or the like.

SUMMARY

The device is a multi-functional tie down, which quickly and easily attaches to a truck bed or other similar object. It is an effective means of quickly and easily securing loads or items of various sizes and shapes by means of a rope, cable, strap, with or without hooks or closed ends attached to them. It does not require the threading of such means through a hole. It accomplishes this without the need to drill holes in the truck bed and it will not mar or scratch the finish surface of the truck bed rail, or any other surface it may be attached to.

OBJECTS AND ADVANTAGES

This device is of a one-piece design. It is made of aluminum, or other suitable material, and uses a stainless steel set screw with a nylon tip to secure it to the truck rail or other similar object. The device has a slot that runs the length of it, which allows it to be easily and quickly attached. The stainless steel set screw runs perpendicular to the slot, and when tightened down, clamps the device to the truck rail.

The invention is a multi-functional tie-down, which will accommodate a variety of means (such as rope, cable or a strap, with or without hooks or closed ends attached to them) to secure loads or items of varying sizes and shapes located anywhere within a truck bed. It accomplishes this without the need to drill holes. It will not mar or scratch the finished surface of the truck bed rail or any other surface to which it is attached.

The advantages of this invention, and how it solves existing problems identified above, are as follows:

1. It will attach easily to any location along the length of the truck bed rail.

2. It will not require drilling of holes in the truck bed.

3. It will not mar or scratch the finish of the truck.

4. It will not protrude above the truck bed cap.

5. It will allow ropes, cables or straps to be attached in any direction and not affect the performance of the device.

6. It will easily accommodate ropes, cables or straps with hooks or closed ends to be attached to it.

7. It is a simple, one-piece design that will not rust or corrode.

DRAWING FIGURES

DETAILED DESCRIPTION OF THE INVENTION

Figure 1:
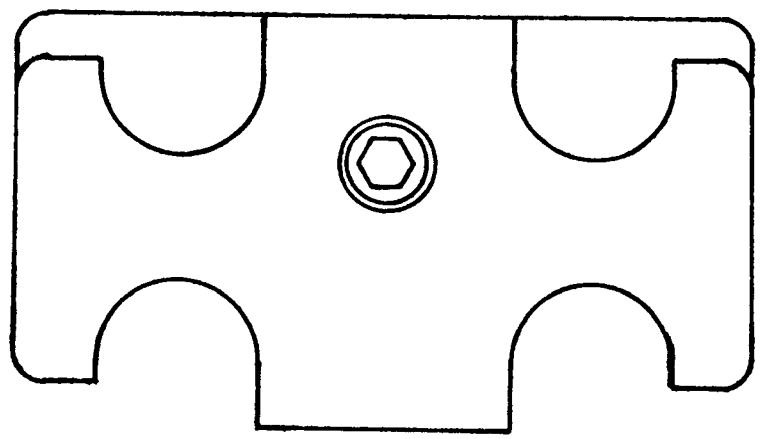
FIG. 1 is a front view of the device, showing a stainless steel set screw, with a nylon tip that fastens the device to the truck bed rail. Also, this view shows the points or cleats on each end of the device where a rope, cable, strap, etc., would be attached to the device.

Referring to FIG. 1, this view shows the tie-down device oriented in the manner in which it would be installed to the downward, interior edge of the truck bed cap or rail. The device has a threaded hole centered in the length of the device and off center toward the upper half of the device. The threaded hole receives a stainless steel, hex head set screw with a nylon tip, which is used to fasten the device to the truck rail. The function of the set screw is primarily to retain or secure the device to the desired location along the truck rail. Just slightly in from each end of the device are radius grooves—one at each end of the top portion and one at each end of the bottom portion. The radius grooves run partially from the outer edge top and bottom toward, but not all the way, to the center portion of the device. These radius grooves form a portion of the area which allows a rope, cable, strap, hook, etc., to be secured to the device in any direction without having to be threaded through, but rather hooked to, such as a cleat.

Figure 2:
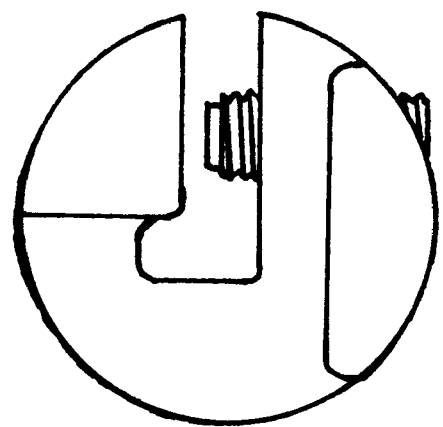
FIG. 2 is an end view showing a slot, with a relief at the bottom. The slot runs lengthwise of the device in which the truck rail (downwardly-protruding edge of the truck bed cap, at the interior portion of the truck bed) fits into.

The device is cylindrical in design as seen from FIG. 2. The device has a slot or groove that begins at the top center and extends slightly beyond the center, or core, of the device. As seen from this view, the slot has a small relief in the bottom portion that extends toward the rear. This slot with the relief in the bottom is the portion of the device that is designed to accommodate a variety of truck rail configurations. The slot allows the device to fit or slide upward onto the rail portion of the truck bed cap. This same slot with the relief forms a basic hook configuration to the device, which is the primary means in which the device is able to secure loads or items to the truck bed rail. Also shown is a large or wide relief which runs from each end toward, but not all the way to, the center of the device and runs completely through the device from top to bottom. This relief allows a rope, cable, strap, hook, etc., to fit between the bed rail and the front portion of the device. The top view of this relief, which begins at each end of the device and extends toward the center, can be seen in FIG. 3. The end view of this relief can be seen in FIG. 2, and a partial view in FIG. 4.

Figure 3:
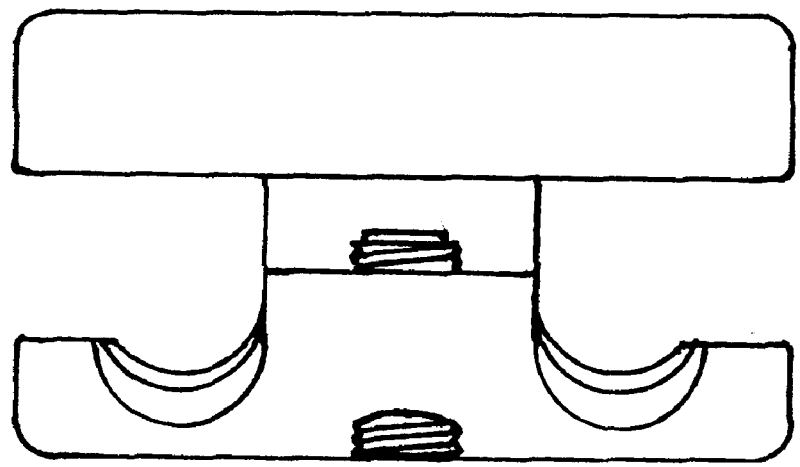
FIG. 3 is a top view of the device showing the slot that runs lengthwise of the device in which the truck rail fits into. This view also shows the radius grooves at each end of the device which form the portion of the device where ropes, cables, straps, hooks, etc., can be attached.
Figure 4:
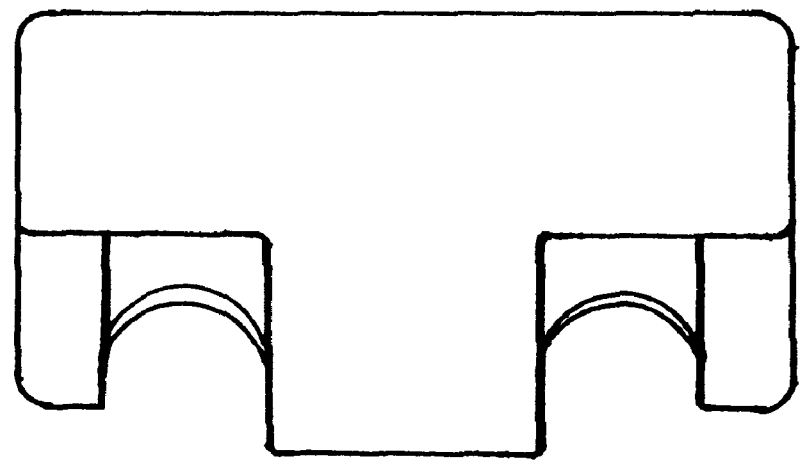
FIG. 4 is a rear view of the device showing the portion of the device that would be located behind the truck rail.

The top view of the smaller slot with relief, which accommodates the truck rail, can be seen in FIG. 3. Also in FIG. 3, in from each end of the device are the radius grooves referred to in FIG. 1. FIG. 3 shows another radius groove which runs perpendicular to, and at the same distance in from, the ends as are the radius grooves in FIG. 1, and, therefore, intersects the radius grooves shown in FIG. 1 and seen in FIG. 2. As seen in FIG. 3, these radius grooves run all the way from top to bottom of the device and come from the center toward the outer or front portion of the device. Where the radius grooves intersect, the corners are chamfered so as to provide a smooth, snag-free edge for ropes, cables, straps, etc., to come in contact with. As can be seen in FIG. 3, the radius grooves provide an adequate and secure means of attaching a rope, cable, strap, hook, etc., to the device.

As shown in FIGS. 1, 2, 3, 4, and 5, there is a portion of the device that runs the full length of the device, at the upper, rear portion. This rear, upper portion provides backing to which the stainless steel set screw clamps the device to the truck rail.

Figure 5:
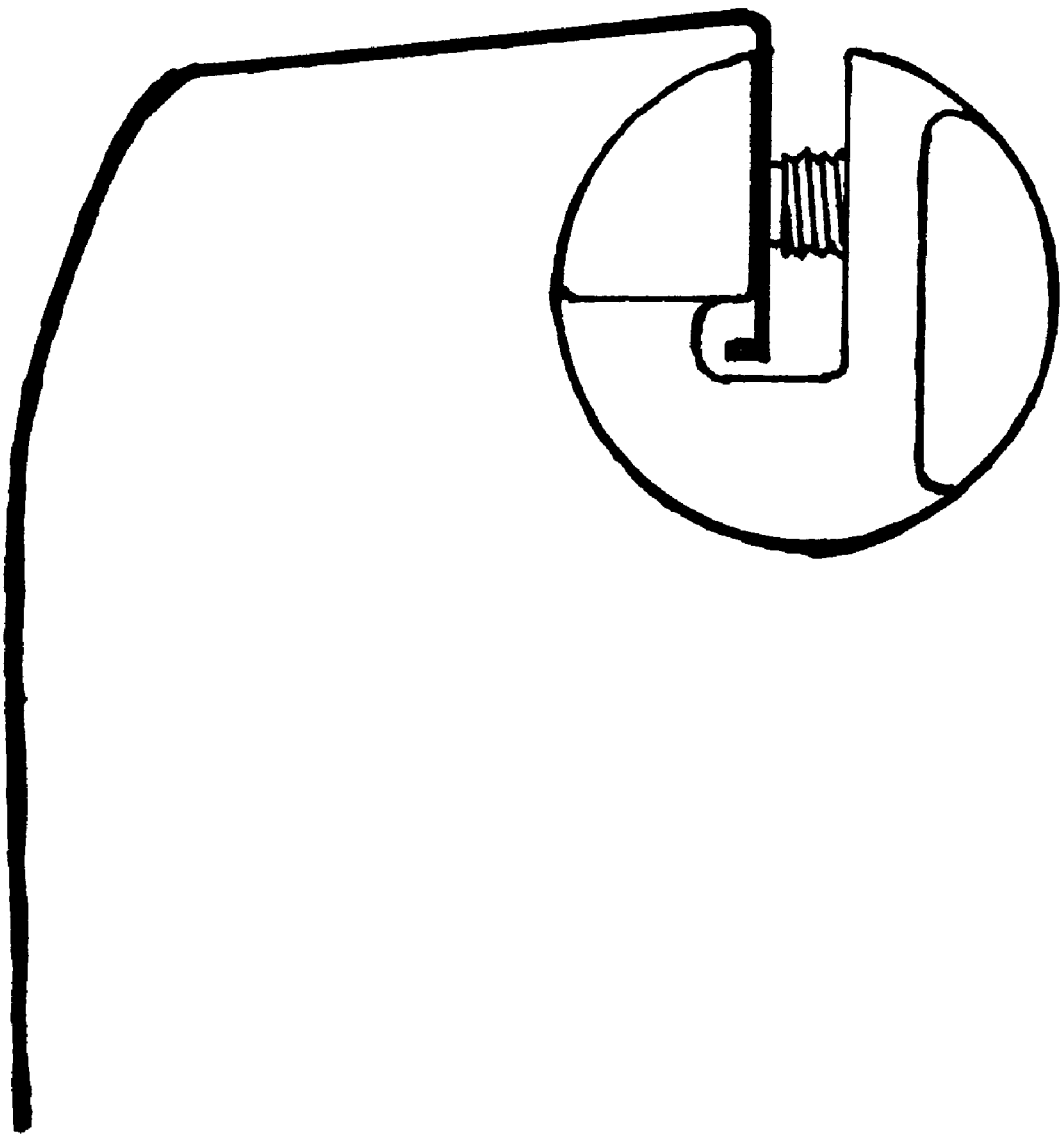
FIG. 5 is a sectional view of the upper portion of a truck bed, showing the end view of the device, with the device fastened to the rail portion of the truck bed cap.
Figure 6:
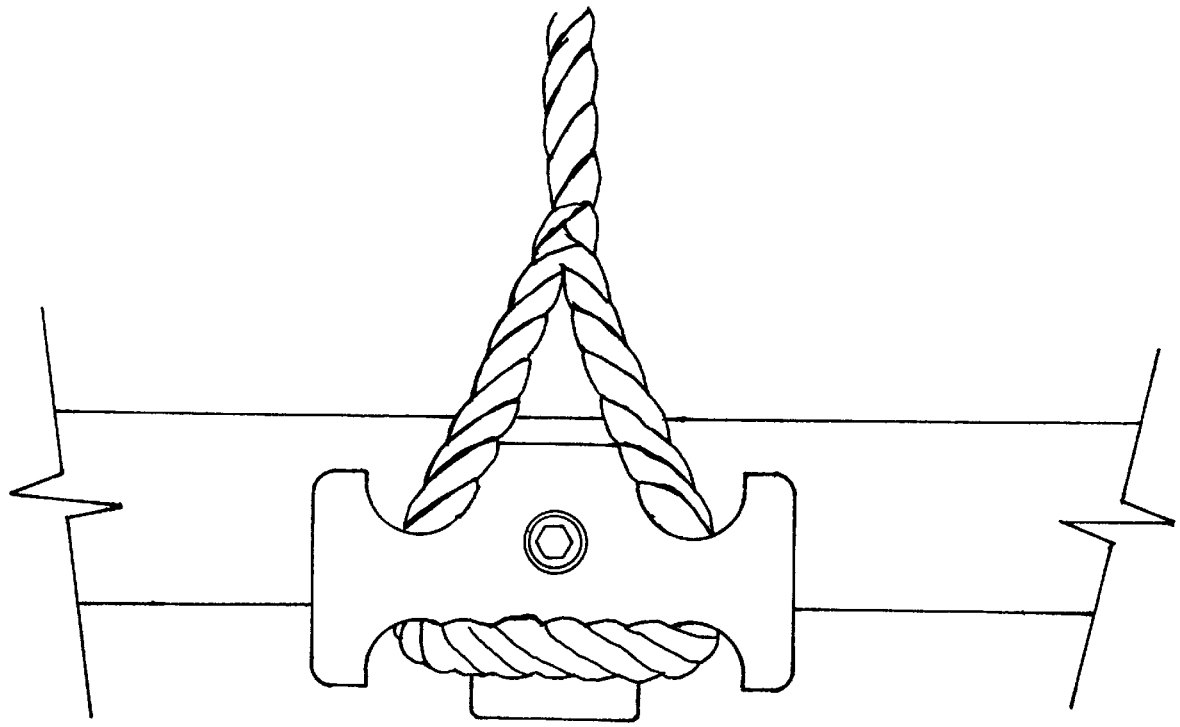
FIG. 6 is a front view of the device, showing it fastened to the truck bed rail. It also illustrates one of the ways in which a rope, strap or cable with a looped end can be easily attached.
Figure 7:
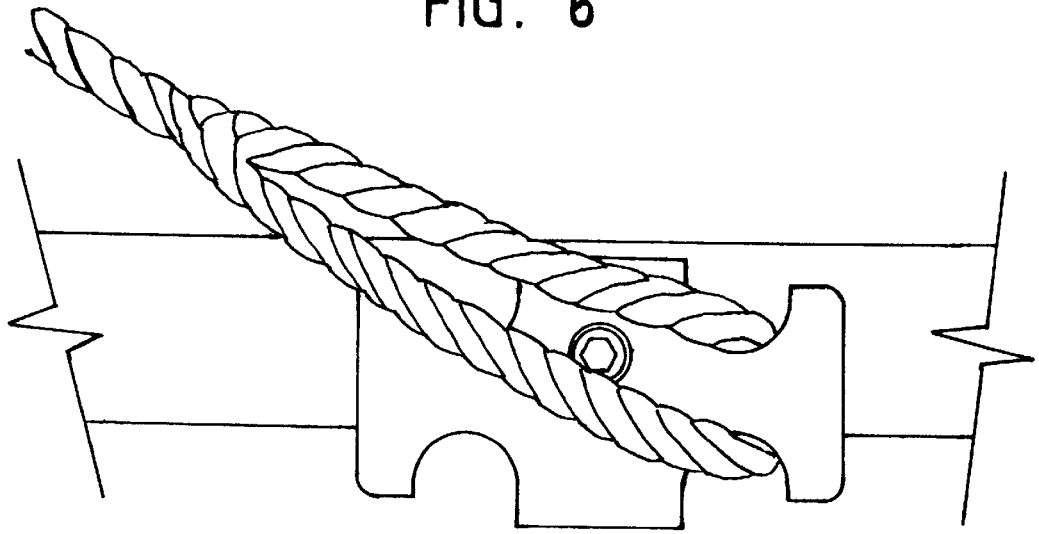
FIG. 7 is another front view of the device showing the device fastened to the truck bed rail, typical of FIG. 6. This view also illustrates how a rope, cable, strap, etc., can be easily attached at any angle to the device.

The main application of this device can be readily seen in FIGS. 5, 6 and 7. The tie-down down device is a very simple, one-piece design which provides a great variety of means to secure items to a truck bed. It basically is a hook that by means of a set screw is able to be retained at any desired location on the truck rail. This invention functions basically like a cleat, which allows items to be quickly and easily secured, as well as unsecured. It is easily located at the optimum location along the truck rail to accommodate loads or items of any size or shape, as well as at any location within the truck bed. It is a unique design that is very functional, unobtrusive, and at the same time aesthetically appealing. This device will be a welcome addition to most all pickup trucks. Although this device has been mainly described as useful to pickup trucks, it also has a variety of other applications where items need to be secured quickly and without drilling holes.

We claim:

1. A tie-down device that is multi-functional, securable and removable to a vehicle for securing items to or within the vehicle, said device comprising a cylindrical piece comprised of a slot that runs the length of the device forming a hook-type configuration, and creating a front and rear portion to the device which allows the piece to fit up into a downwardly-protruding edge of the vehicle, a nylon tipped set screw threadingly received by the piece, said piece being securable in place by means of said set screw with said nylon tip at the portion of the screw that comes in contact with the downwardly-protruding edge .

2. The device of claim 1 wherein said cylindrical piece has radius grooves that are perpendicular to the length of the piece, said grooves are located at each end of the front portion of the piece with chamfered, eased edges of the radius grooves and thereby forming a cleat-like configuration which accommodates the attaching of a fastening means to the device.

3. The device of claim 1 or 2, wherein said device is a unitary piece of material that is cast or machined, with a threaded hole approximately in the center of the front portion of the device to accommodate said set screw that will secure the device to the vehicle.

* * * * *